United States Patent
Purnadi et al.

(10) Patent No.: US 6,456,849 B1
(45) Date of Patent: Sep. 24, 2002

(54) APPARATUS AND ASSOCIATED METHOD, FOR ALLOCATING RESOURCES IN A RADIO COMMUNICATION SYSTEM TO PERFORM A COMMUNICATION SERVICE

(75) Inventors: Rene Purnadi, Coppell, TX (US); Liangchi Alan Hsu, Arlington, TX (US); Zhigang Rong, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/365,320

(22) Filed: Jul. 30, 1999

Related U.S. Application Data (60) Provisional application No. 60/094,932, filed on Jul. 31, 1998.

(51) Int. Cl.$^7$ ............................................. H04Q 7/20
(52) U.S. Cl. .................. 455/453; 455/450; 455/451; 455/452; 455/454
(58) Field of Search ..................... 455/453, 452, 455/451, 450, 454

(56) References Cited

U.S. PATENT DOCUMENTS

| | | | |
|---|---|---|---|
| 5,697,054 A | * 12/1997 | Andersson | 455/524 |
| 5,873,038 A | * 2/1999 | Guimont | 455/453 |
| 6,097,733 A | * 8/2000 | Basu et al. | 370/468 |
| 6,128,500 A | * 10/2000 | Raghavan et al. | 455/453 |
| 6,223,041 B1 | * 4/2001 | Egner et al. | 455/452 |

* cited by examiner

Primary Examiner—Daniel Hunter
Assistant Examiner—Alan T. Gantt
(74) Attorney, Agent, or Firm—Federico Fraccaroli (57) ABSTRACT

Apparatus, and an associated method, for allocating communication resources to effectuate a communication service at a selected quality level in a spread-spectrum, cellular communication system. A determination is made at a serving cell whether communication resources are available to effectuate the communication service adequately. If adequate communication resources are not available at the serving cell, resources are borrowed at another cell. Resources of the serving cell together with resources of the additional cell together permit the effectuation of the communication service.

23 Claims, 3 Drawing Sheets

APPARATUS AND ASSOCIATED METHOD, FOR ALLOCATING RESOURCES IN A RADIO COMMUNICATION SYSTEM TO PERFORM A COMMUNICATION SERVICE

CROSS-REFERENCE TO RELATED APPLICATIONS

The present application claims the priority of provisional patent application, serial No. 60/094,932, filed on Jul. 31, 1998.

The present invention relates generally to the effectuation of a communication service in a radio communication system, such as a cdma2000 or other cellular, direct-sequence, spread-spectrum system. More parts the present invention relates to apparatus, and an associated method, by which to allocate communication resources to effectuate the communication service at a selected quality level.

In a cellular system, if communication resources at a serving cell are determined to be insufficient to effectuate the communication service, communication resources are borrowed from another, e.g., adjacent cell. The communication resources for more than one cell are thereby allocated to provide for the effectuation of the communication service at the selected quality level.

BACKGROUND OF THE INVENTION

A communication system is formed, at a minimum, of a transmitting station and a receiving station which are interconnected by a communication channel. Communication signals generated by the transmitting station are transmitted upon the communication channel to be received at the receiving station.

A radio communication system is a communication system in which at least a portion of the communication channel is formed of a portion of the electromagnetic spectrum. Communication mobility is permitted to be increased as a fixed, or hard-wired, connection is not required to be formed between the transmitting and receiving stations.

A cellular communication system is exemplary of a radio communication system. A subscriber to a cellular communication system, when positioned at almost any location throughout an area encompassed by the network infrastructure of the cellular communication system, is able to communicate by way of a mobile terminal.

The network infrastructure of an exemplary cellular communication system includes spaced-apart, fixed-site base stations which include transceivers. In such an exemplary system, each fixed-site base station defines a cell. As the mobile terminal used by the subscriber to communicate with another communication station travels between cells of the system, uninterrupted communication is possible by handing-over communications from one base station to another.

While various standards have evolved pursuant to which cellular communication systems are constructed, advancements in digital technology have permitted the development of standards, and implementation of systems capable of more efficiently utilizing the bandwidth available for such systems. Also, such advancements have permitted the introduction of communication services previously unavailable in such systems. For instance, advancements in digital communication techniques have been used in various cellular communication standards, and communication systems have been installed pursuant to such standards. One such standard, referred to as a cdma2000 standard, pertains to a cellular, spread-spectrum system.

A multimedia service, for instance, is exemplary of a new type of communication service permitted in a cdma2000 system, as well as various other cellular communication systems. A multimedia service is, however, relatively bandwidth-, and otherwise resource-, consumptive. Various other communication services are similarly also resource-consumptive.

To properly effectuate a communication service at a selected level of quality, e.g., a QoS (quality of service), level adequate levels of communication resources must be allocated for the performance of the communication service at the selected level of quality.

Most simply, if the communication resources are not available at a serving cell to effectuate the communication service at the selected quality level, permission to attempt to effectuate the communication service can be refused. But, the availability of communication resources is dynamic in that the availability of such resources is susceptible to change during performance of the communication service. If the availability of communication resources drops below a minimum threshold during the performance of the communication service, refusal to permit continued performance of the communication service would result in the abrupt termination of the service.

Proposals also have been set forth by which to lessen the service quality level by which to effectuate the communication service in an orderly manner if the available communication resources are, or become, unavailable at a desired level. Such a plan lessens the likelihood that performance of a communication service shall be abruptly terminated if available communication resources are reduced during performance of the communication service. Also, such a plan increases the likelihood that the communication service shall be permitted to be performed, albeit at a less-than-desired quality level.

Different cells of a cellular communication system, however, might have different levels of communication resources available at a particular time. And, a communication service is sometimes implementable at a selected one of more than one available cells. Communication resources unavailable at one cell to perform the communication service might be available at another of the available cells.

If a manner could be provided by which to utilize communication resources available at more than one cell, together to provide the resources needed to perform a communication service at a selected quality level, improved system performance would result.

It is in light of this background information related to wireless communications that the significant improvements of the present invention have evolved.

SUMMARY OF THE INVENTION

The present invention, accordingly, advantageously provides apparatus, and an associated method, by which to allocate communication resources in a radio communication system, such as a cellular communication system, to effectuate a communication service at a selected quality level.

When a communication service is to be performed, a determination is made as to whether communication resources are available at a serving cell to effectuate the communication service. If adequate communication resources are determined to be available at the serving cell, the necessary amount of resources are allocated to effectuate the communication service, and performance of the communication service is commenced utilizing communication resources of only the serving cell. If, however, adequate amounts of communication resources are determined not to be available at the serving cell to effectuate the communication service at the selected quality level, communication resources are borrowed from another cell, if possible, such that the communication resources of the serving cell together with the communication resources of the additional cell are together of an amount to permit the effectuation of the communication service at the selected quality level.

Determinations are made both during set-up of communications as well as during performance of the communication service. If, for instance, communication resources are available at the serving cell during communication set-up, performance of the communication service is commenced utilizing only the resources at the serving cell. If, during performance of the communication service, the communication resources at the serving cell become insufficient to perform the communication service at the selected quality level, resources are borrowed, if possible, from another cell to permit continued performance of the communication service at the selected quality level.

In one aspect of the present invention, a manner is provided for the network infrastructure of the cellular communication system to determine whether communication resources are available at a serving cell to permit the effectuation of a communication service at a selected quality level. If the required amount of communication resources is determined to be available at the serving cell, a request is made to utilize only the resources at the serving cell to effectuate the communication service. If, conversely, a determination is made that resources are not available at the serving cell to effectuate the communication service at the selected quality level, a request is made to borrow communication resources from another cell so that, together, communication resources of the serving cell and the additional cell provide the communication resources required to effectuate the communication service at the selected quality level.

The cellular communication system forms, for instance, a spread-spectrum system, generally such as that defined in the cdma2000 standard. In an aspect of the present invention, the system is further operated alternately in a non-shared mode and a shared mode relative to a particular communication service with a particular mobile station. When communication resources are available at the serving cell to perform the communication service, the system is operated in the non-shared mode. The non-shared mode includes a non-soft-handover mode and a soft-handover mode. In a conventional soft-handover mode, forward link signals are provided to two or more base stations and transmitted from such base stations. When, conversely, communication resources are borrowed from the additional cell so that communication resources are combined from at least two cells to provide the communication resources to effectuate the communication service, the system is operated in the shared mode. In this mode, a portion of the communication service is provided at the serving cell and another portion of the communication service is provided at the additional cell. Thereby, signals transmitted at the serving cell and at the additional cell are dissimilar.

In another aspect of the present invention, apparatus is provided to a mobile station to permit operation of the mobile station in both the non-shared mode and also the shared mode. The mobile station includes a rake receiver having rake fingers. When the mobile station is operated in the soft-handover mode of the non-shared mode, the rake fingers receive indications of signals transmitted by different base stations on a forward link. When operated in the soft-handover mode of the non-shared mode, the signals transmitted by the different base stations are of common values. In this mode of operation, the rake fingers are coupled to a symbol combiner at which the symbols of the signals detected by the different rake fingers are combined together. Thereafter, the combined signals are processed by other radio circuitry of the mobile station. If, conversely, the system is operated in the shared mode, different signals, representative of different portions of the communication service are formed and transmitted by the different base stations. When operated in the shared mode, the rake fingers are again coupled to receive signals generated by different ones of the base stations. Because the different ones of the base stations transmit dissimilar signals, the rake fingers are not coupled to a symbol combiner, but, rather, the signals received from different ones of the rake receivers are separately processed.

In one implementation, request for service initiation is generated by a mobile station. The request is transmitted upon a reverse link to a serving base station system. A determination is made at the serving base station system as to whether resources are available thereat to permit the effectuation of the requested communication service. If not, the mobile station is ordered to measure signal strength levels of pilot signals generated at neighboring cells. The measurements are made, and the mobile station returns to the serving base station system indications of the signal strength measurements.

If a measured signal strength of a pilot signal generated at a neighboring cell is at least of a threshold value, a request is made by the serving base station system to the base station system associated with the pilot signal as to whether communication resources are available at the other base station system to be borrowed to effectuate the requested communication service. If so, resources are assigned from the other cell along with the serving cell, together to provide the resources to effectuate the communication service. Traffic channel assignments associated with each of the cells is provided to the mobile station, and serving and shared traffic channels are established with respective base station systems. Thereafter, performance of the communication service is commenced. Thereby, a manner is provided by which to insure better that a communication service shall be effectuated at a selected level of quality.

In these and other aspects, therefore, apparatus, and an associated method, is provided for a radio communication system. The communication system includes a serving cell and at least one additional cell. Each of the serving cell and the at least one additional cell is defined by a base station selectably capable of communicating with a mobile station pursuant to a communication service. The communication service requires allocation of a selected amount of system resources to effectuate the communication service. The selected amount of system resources is allocated, if possible, to effectuate the communication service. A determiner is coupled to receive communication indicia of communication between the mobile station and the base station defined in the serving cell, and also between the mobile station and a base station defining at least one of the at least one additional cell. The determiner is operable responsive to the communication indicia to determine whether the selected amount of the system resources are available at the serving cell to effectuate the communication service. A requestor is operable responsive to determinations made by the determiner. The requestor requests allocation of the selected amount of system resources at only the serving cell if the determiner determines the selected amount of system resources to effectuate the communication service is available at the serving cell if the determiner determines the selected amount of system resources to effectuate the communication service is not available at the serving cell, the requester requests allocation of system resources at the serving cell and at a selected additional cell of the at least one additional cell. The system resources at the serving cell and at the selected additional cell together form the selected amount of system resources.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
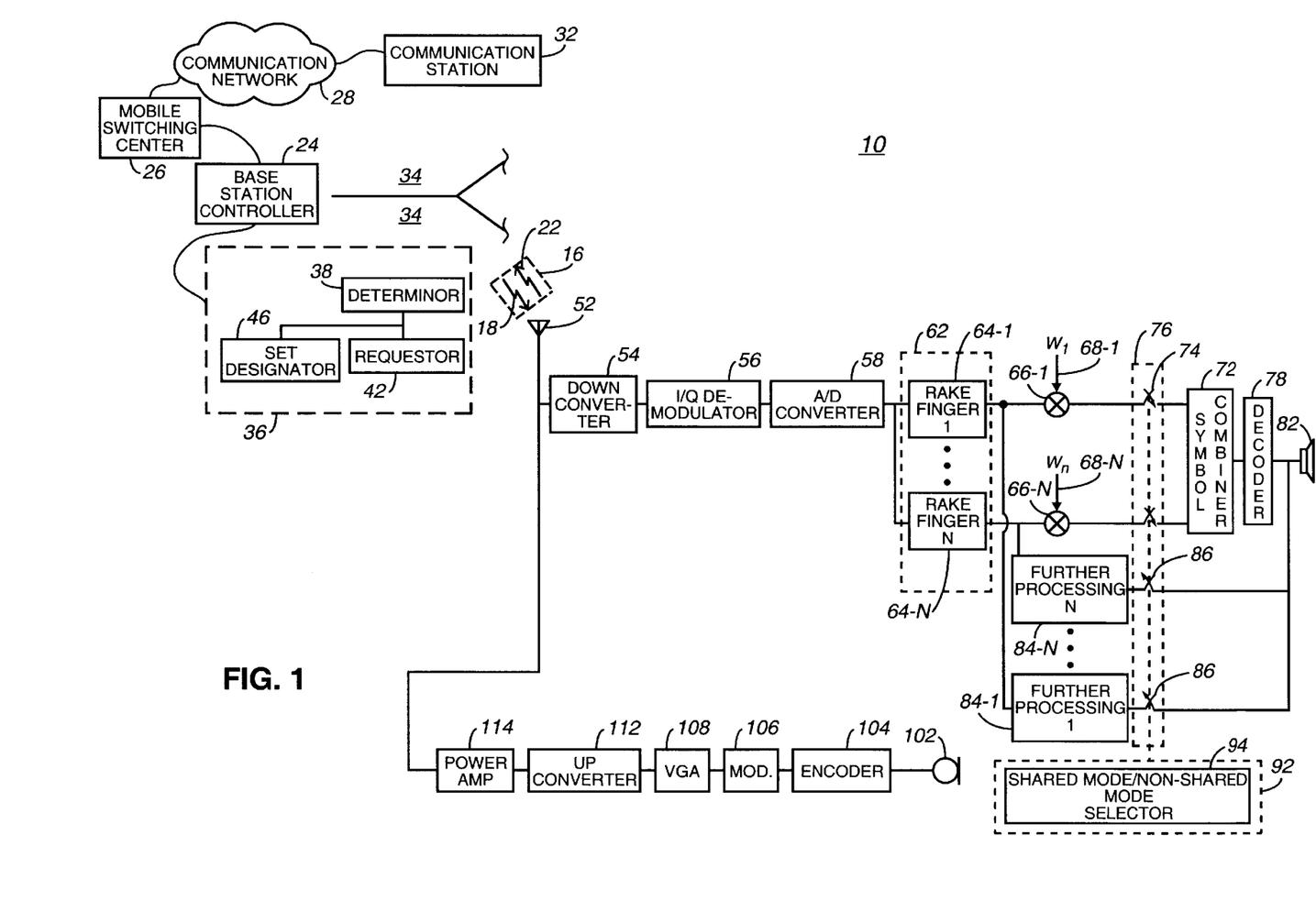
FIG. 1 illustrates a functional block diagram of a communication system in which an embodiment of the present invention is operable.

Referring first to FIG. 1, a communication system, shown generally at 10, provides for radio communications between a mobile station 12 and base station systems 14 of the network infrastructure of the communication system. Communications between the mobile station and a base station system is provided by way of a radio-link 16, here including a forward link 18 and a reverse link 22. In the exemplary implementation, the communication system corresponds in general to the standards set forth in the proposed cdma2000 standard. In other implementations, other types of radio communication systems can analogously be represented.

The base station systems 14 are here shown to be coupled to a base station controller (BSC) 24 which, in turn, is coupled to a mobile switching center (MSC) 26. The MSC is coupled to a communication network 28 which is coupled to other structure including, as shown, a remote communication station 32. During operation of the communication system, a communication path is formed, for instance, between the mobile station 12 and the communication station 32. The communication path includes the radio-link 16 as well as a wireline link through the network infrastructure.

The bottom, (as shown) base station system 14 here forms the serving cell for the mobile station 12 as the mobile station 12 is here positioned within a geographical area forming a cell 34. A cell 34 is associated with, and defined by, a corresponding one of the base station systems 14.

The serving base station system 14 is here shown to include functional elements which together perform the functional operations of an embodiment of the present invention. Here, the elements form the apparatus, here shown at 36, of an embodiment of the present invention. While not separately shown, the top-most (as shown) base station system 14 also includes the apparatus 36. Here, the apparatus 36 is shown to be formed of a determiner 38, a requestor 42, and a set designator 46.

The determiner 38 is operable to determine whether a communication service, either initiated at the mobile station, or to be terminated thereat, is able to be effectuated with communication resources available at the serving base station system. That is to say, the determiner determines whether communication resources are available at the serving cell to effectuate the communication service at a selected quality level. Determinations are made by the determiner, in the exemplary implementation, both prior to initiation of the performance of the communication service and during the performance of the communication service. The determiner is further operable to determine whether resources are available at other cells 34 defined by other, available base station systems to be borrowed therefrom to facilitate the effectuation of the performance of the communication service.

The requestor 42 is coupled to receive indications of determinations made by the determinor 38. The requestor is operable to request allocation of communication resources to permit the effectuation of the communication service.

When a determination is made by the determiner that resources are available at the serving cell to effectuate the communication service, request for allocation of communication resources is made for allocation of such resources only at the serving cell at the requestor 42. If, however, determination is made by the determiner that resources must be borrowed from an additional cell to permit to effectuation of the communication service at a selected quality level, then the requestor generates a request for the allocation of the resources from both the serving cell and the additional cell to permit the communication service to be performed.

The set designator 46 is operable to designate cells to be members of particular sets. In particular, the set designator designates cells to be members of a shared set of cells. A member of the shared set is a cell, or more than one cell, from which communication resources are borrowed. In the exemplary implementation, to become a member of the shared set, a cell must generate pilot signals of signal strengths, when detected at the mobile station, which are at least as great as a minimum threshold and which have communication resources available to be borrowed by the serving cell to effectuate the communication service.

The mobile station 12 includes both a receiver and a transmitter portion to permit reception of forward link signals transmitted thereto and to generate reverse link signals for transmission to the network infrastructure of the communication system, respectively. The receiver portion is coupled to an antenna transducer 52 which converts forward link signals detected thereat into electrical form. The receiver portion includes a down converter 54 which down-converts in frequency the signals applied thereto from a radio frequency to a baseband frequency. In the exemplary implementation, the down-converter is formed of multiple down-conversion stages. Down-converted signals generated by the down-converter are applied to an I/Q demodulator 56 which generates I- and Q-components which are applied to an A/D (analog-to-digital) converter 58. Typically, a separate A/D element is coupled to receive the I- and Q-signals generated by the demodulator.

Digitized signals are provided to a rake receiver 62 which includes a plurality of rake fingers 64. Here, the rake receiver is formed of N rake fingers 64-1, ... 64-N. The rake finger 64-1 is coupled to a first weighting element 66-1 which weights the signal generated by the first rake finger 64-1 with a first weighting signal generated on the line 68-1. An analogous signal weighting is performed with the signal generated by the N rake finger 64-N by a signal weighter 66-N with a weighting signal generated on the line 68-N.

The receiver portion further includes a symbol combiner 72 which is coupled to receive the weighted signals generated by the weighting elements 66-1 through 66-N when poles 74 of a switch element 76 are in a closed position. The symbol combiner is operable to combine the symbols of the weighted signals, and to provide a combined signal formed therefrom to a decoder 78 and, once decoded, to provide it to an information sink 82.

The rake fingers 64-1 through 64-N are also coupled to further processing elements 84-1 through 84-N, respectively. The elements 84-1 through 84-N are coupled to the information sink 82 when the poles 86 of the switch element 76 are in the closed position. As indicated in the Figure, when the poles 86 are in the closed position, the poles 74 are in the open position and vice versa. Thereby weighted signals formed by the weighting elements 66-1 through 66-N are either combined at the symbol combiner 72, or signals generated by the rake finger 64-1 through 64-N are processed by the further processing elements 84-1 through 84-N, thereafter to be provided to the information sink.

The mobile station also includes a controller 92 operable to control various aspects of operation of the mobile station. Here, the controller 92 is shown to include a functional element forming a shared mode/non-shared mode selector 94 operable to select the switch positions of the switch element 76.

The mobile station further includes a transmit portion including an information sink 102 and an encoder 104, a modulator 106, a variable gaining amplifier (VGA) 108, an up-converter 112, and a power amplifier 114. The transmit portion of the mobile station is operable to generate the reverse link signals which are transmitted on the reverse link 22 back to the network infrastructure.

For a given communication service to be effectuated with a mobile station 12, the communication session is operated alternately in a non-shared mode or in a shared mode. When the determiner of the base station system determines that communication resources are available at the serving cell to effectuate the communication service, only communication resources at the serving cell are utilized in the performance of the communication service. The system is then operated in the non-shared mode. The non-shared mode includes, for instance, a non-soft handover mode and a soft-handover mode of operation. When operated in the soft-handover mode, the down link signals generated pursuant to the communication service are transmitted by more than one base station to permit non-shared mode of communications when the mobile station travels from cell to cell.

When operated in the non-shared mode, poles 74 of the switch element 76 of the mobile station are positioned in the closed position and signals received at the different rake fingers of the rake receiver are combined together, in conventional manner, better to reproduce the down link signal transmitted by the network infrastructure. Each rake finger can be assigned to receive signals generated at different cells, or more than one rake finger can be assigned to receive signals generated at a single cell but which travel along different paths.

If, however, communication resources are borrowed from an additional cell, the communication session is performed in a shared mode. In such a mode, different signal portions of the communication service are transmitted from different base station systems of the network infrastructure. The poles 86 of the switch element 76 of the mobile station are positioned in the closed position, and the poles 74 are positioned in the open position. The signals formed by the rake fingers 64-1 through 64-N are not combined by a symbol combiner but are processed separately at the further processing elements 84-1 through 84-N.

Figure 2:
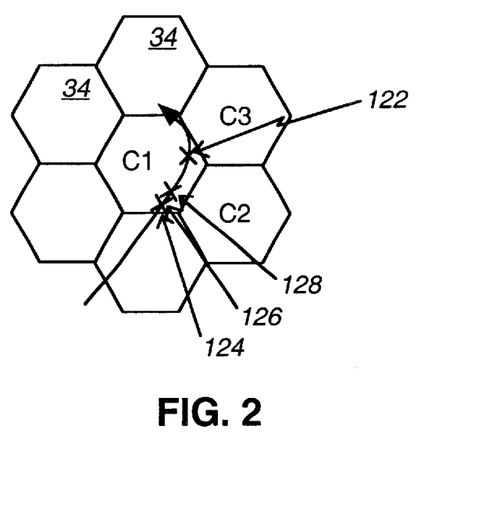
FIG. 2 illustrates an exemplary path of travel of a mobile station of the communication system shown in FIG. 1.

FIG. 2 illustrates a group of cells 34 of the communication system 10 shown in FIG. 1. Three of the cells are designated by the designations C1, C2, and C3. A path 122 represents exemplary travel of a mobile station through the cells 34. Locations 124, 126, and 128 represent the position of the mobile station at times T1, T2, and T3, respectively, as the mobile station travels along the path 122.

The mobile station is operable to measure signal strengths of pilot signals generated by the base station systems defining each of the cells 34.

Figure 3:
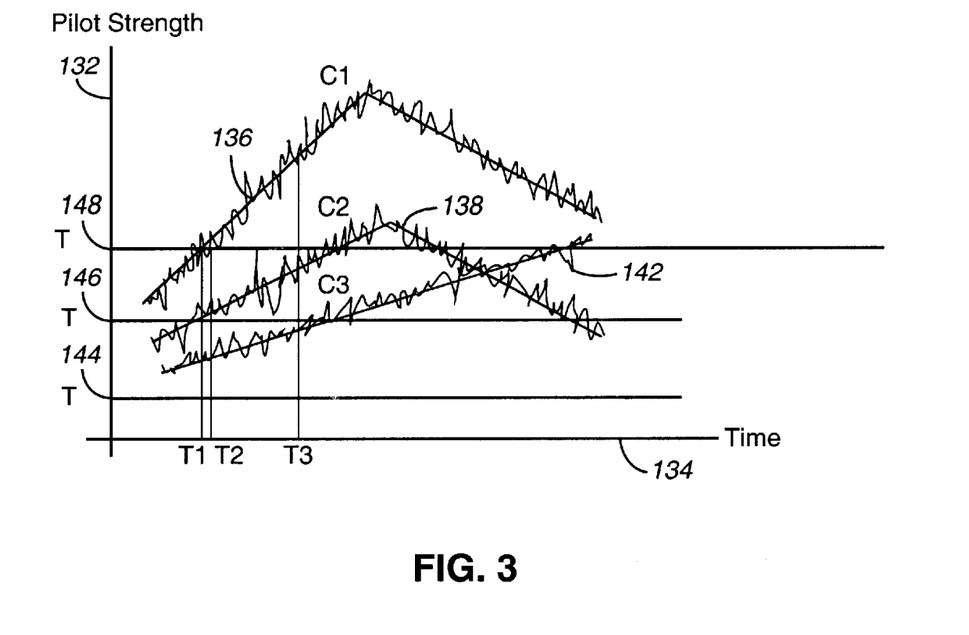
FIG. 3 illustrates a graphical representation of measured pilot signal strengths of pilot signals generated by base station systems which define three of the cells shown in FIG. 2 by the mobile station at three different times during its path of travel shown in FIG. 2.

FIG. 3 illustrates signal strength measurements made by the mobile station, plotted on the ordinate axis 132 as a function of time plotted along the abscissa axis 134. Here, the signal strength of pilot signals generated by the base station system defining the cell C1, when measured by the mobile station is represented by the plot 136. Similarly, the signal strength of the pilot signal generated by the base station system defining the cell C2 is represented by the plot 138. And, the signal strength of the pilot signal generated by the base station system which defines the cell C3 is represented by the plot 142.

Three signal strength levels are indicated along the ordinate axis 132. A T_DROP level 144 represents a minimum signal strength level at which communication services can be effectuated. T_SHARE level 146 represents a signal strength level of a base station system at which communication resources could be borrowed. And, the signal strength level T_ADD 148 represents a signal strength level at which handover of communications when the system is operated in the non-shared mode. T_share can be defined to be equal to T_add. Times T1, T2, and T3, the times at which the mobile station is located at the positions 124, 126, and 128, are also plotted along the abscissa axis 134.

At time T1, the pilot signal strength measurement of the base station system defining the cell C1 is above T_ADD. The resources at the cell C1, however, are not sufficient to support fully the effectuation of a communication service at a desired quality level. The adjacent cells C2 and C3 have resources to spare, but resources can be borrowed only from the cell C2 as, at time T1, the pilot signal strength of the base station system defining the cell C2 is above the T_SHARE value while the pilot signal strength of the pilot signal generated by the base station system defining the cell C3 is below the value T_SHARE. Cells C1 and C2 are defined to belong to a sharing set for the mobile station at the time T1.

At time T2, the mobile station is in a shared-state, and a communication service is able to be effectuated by utilizing communication resources available from the cells C1 and C2.

At time T2, the mobile station remains in the shared-state, served by the shared resources at cell C1, the serving cell, and C2, the additional, or sharing, cell.

At time T3, the resources at the cell C1 are adequate for the effectuation of the communication service utilizing only the resources at the cell C1. The borrowed resources from the cell C2 are released, even though the signal strength of the pilot signal generated by the base station system defining the cell C2 is beyond the T_SHARE level. In the exemplary implementation, the borrowed resources are released, when possible.

Figure 4:
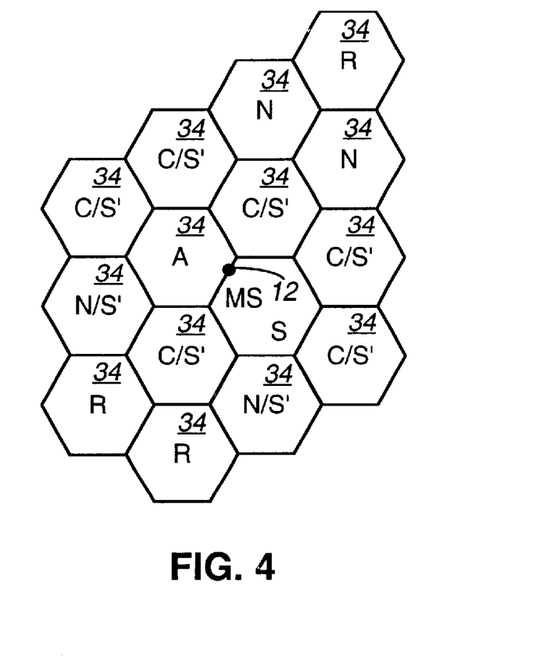
FIG. 4 illustrates exemplary cell designations defined during exemplary operation of an embodiment of the present invention.

FIG. 4 again illustrates a plurality of cells 34 defined in the communication system 10 shown in FIG. 1. Here, the cells are identified as being numbers of sets as designated by the set designator 46 forming a portion of the apparatus 36 of the base station system 14. Here, a cell identified with the letter "A" is indicated to be a member of an active set. A cell designated by the letter "C" is identified as being a member of a candidate set. A cell identified by S' exhibits a pilot strength about T_share. A cell identified by the letter "S" is a member of a shared set wherein a member of the shared set exhibits a pilot strength above T_share and from which resources for the forward traffic channel are borrowed and assigned to the mobile station. And, cells identified by the letters "N" and "R" are identified as being members of a neighbor set, and a remaining set respectively.

Figure 5:
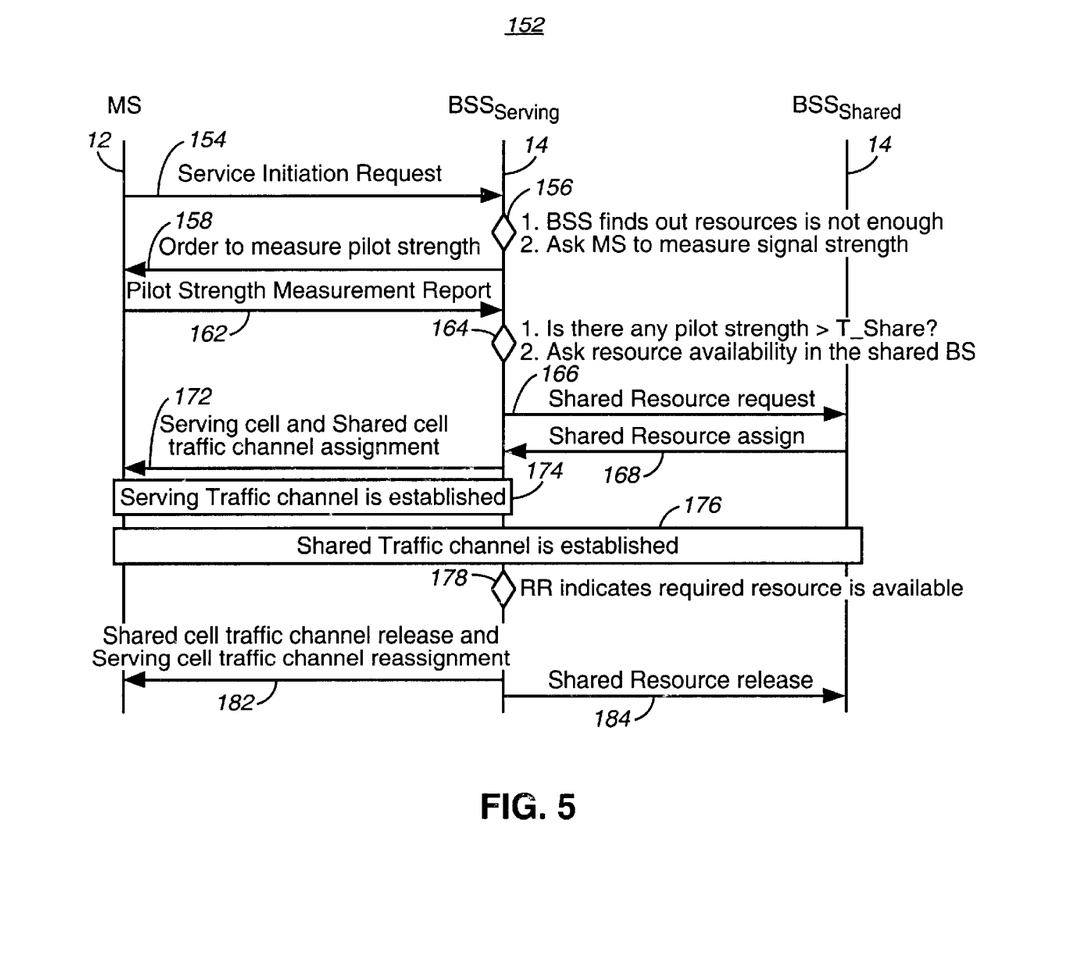
FIG. 5 illustrates a message sequence chart representing the signal sequencing of signals generated during operation of an embodiment of the present invention.

FIG. 5 illustrates a message sequence chart, shown generally at 152, of signaling between the mobile station 12, a serving base station system 14, and a shared base station system 14, during exemplary operation of an embodiment of the present invention.

Here, a request for effectuation of a communication service is initiated by the mobile station by a service initiation request, indicated by the segment 154, sent by the mobile station to the serving base station system. When the request is received at the base station system, a determination is made whether resources are available at the serving base station system to effectuate the communication service. Here, for purposes of example, the serving base station system determines, at the decision block 156, resources are not available solely at the serving base station system to effectuate the communication service. A request is then made, as indicated by the segment 158, or the mobile station to measure pilot signal strength generated at cells other than the serving cell. The mobile station makes the measurements and generates a report, indicated by the segment 162, which is returned to the serving base station system.

A determination is made, as indicated by the decision block 164, as to whether any of the measured signal strengths are of values greater than T_SHARE. If so, a resource availability at the base station system associated therewith is made, as indicated by the segment 166. Here, for purposes of example, resources are available, and a shared resource assigned signal, indicated by the segment 168, is returned to the serving base system. Thereafter, a serving cell and shared cell traffic channel assignment, determined at the network infrastructure, is forwarded, as indicated by the segment 172 to the mobile station. Serving-traffic and shared-traffic channels are established, as indicated by the blocks 174 and 176 respectively.

At the decision block 178, a determination is made that the resources have become available at the serving base station system to effectuate the communication resource. The borrowed resources from the shared base station system are no longer required. Thereafter, and as indicated by the segment 182, the mobile station is instructed to release the shared cell traffic channel and the serving cell traffic channel is reassigned to include the additional resource capacity. And, the shared resource is released, indicated by the segment 184 communicated to the shared base station system.

In another example, at a service initiation, if the mobile station indicates multiple pilot strengths beyond the level of T_ADD, the network selects a cell with the strongest power signal strength that has adequate resources to serve the mobile station to effectuate the communication service. Then, the mobile station is directed to a non-shared state if the other cell also has adequate resources. However, if none of the other cells has adequate resources to serve the mobile station entirely to effectuate the communication service, the network selects the cell that has the strongest pilot strength to serve the mobile station at a degraded quality level. Then, the base station system immediately directs the mobile station to a shared-state with the cells that belong to the shared set instead of directing the mobile station to a non-shared state.

In a non-shared scenario, a cell may be qualified for a soft-handoff when the pilot strength is at least equal to the level T_ADD. But, if that cell does not have enough resources available, the network postpones the soft-handoff to that cell. When the pilot strength of the pilot signal generated at the serving cell reaches T_DROP levels, and none of the adjacent cells have adequate resources, the network hands off communications with the mobile station to the cell that has the strongest pilot signal in the shared set, albeit at a degraded service quality level. Then, the network immediately directs the mobile station to a shared-state mode of operation to the cells that belong to the shared-set so that the required resources can be fulfilled together.

When the serving cell has adequate resources, the borrowed resources are returned to the shared cells. The network directs the mobile station to exit from the shared-state mode of operation. Additional traffic channels in the serving cell are used to fulfill the required resources to effectuate the communication service. The network also involves alteration of the SDU of the network infrastructure, at the base station system, from logically disassembling the forward link traffic and distributes to different cells to deliver the entire traffic to the serving cell. Also, the mobile station disables the reassembling of frames coming from different cells when in the non-shared mode as the mobile station receives the entire forward link traffic from only the serving cell. After the additional traffic channels are acquired from the serving cell, the SDU and mobile station modes are simultaneously switched at an agreed time.

In another scenario, the mobile station measures the signal strength of forward pilot channels from different cells and reports the measurements to the base station system of the serving cell. Based on the report, the base station system constructs an active set, a candidate set, a shared set, a neighbor set, and a remaining set at the set designator thereof. Then, for purposes of example, the mobile station initiates a service that requires a forward link capacity exceeding the current capacity of the serving cell. The serving cell, in response, inquires of the resource availability of cells that belong to the shared-set, preferably based upon the sequence of pilot signal strength, starting with the cell exhibiting the greatest signal strength.

Then, the base station sends to the mobile station a shared message indicating PN_OFFSET of the cells that can share the resources and the corresponding channel numbers. The shared message also indicates assigned data rates at each cell. And, the shared message indicates a multiplex/demultiplex scheme that shall be used to disassemble the data at the base station system. If a frame sequence number is used to identify the order of the transmitted frame, the multiplex/demultiplex scheme is not required.

Based on the received shared message, the mobile station assigns the rake fingers of the rake receiver thereof to different cells. The output of the rake fingers assigned to the different base stations is split instead of combined together, as described previously with respect to FIG. 1. The mobile station demodulates the data sent from the different cells to the mobile station and reassembles the data utilizing the same multiplex/demultiplex scheme. When the resources at the serving cell become adequate to provide the communication service at the desired quality of service level, the borrowed resources are released. A share_release message is provided to the mobile station indicating the reassignment of the rake fingers and the cancellation of the data reassembling.

Thereby, a manner is provided by which to better insure that a communication service is effectuated at a desired service quality level. If resources are not available at a serving cell to insure the effectuation of the communication service at the required quality level, resources are borrowed from another cell. If resources later become available at the serving cell to effectuate the communication service, the borrowed resources are returned and performance of the communication service is continued utilizing the resources of only the serving cell.

The previous descriptions are of preferred examples for implementing the invention, and the scope of the invention should not necessarily be limited by this description. The scope of the present invention is defined by the following claims:

We claim:

1. In a radio communication system having a serving cell and at least one additional cell, each of the serving cell and the at least one additional cell defined by a base station selectively capable of communicating with a mobile station pursuant to a communication service, the communication service requiring allocation of a selected amount of system resources to effectuate the communication service, an improvement of apparatus for allocating, if possible, the selected amount of system resources to effectuate the communication service with the mobile station, said apparatus comprising:

a determiner coupled to receive communication indicia of communication between the mobile station and the base station defining the serving cell and between the mobile station and a base station defining at least one of the at least one additional cell, said determiner operable responsive to the communication indicia to determine whether the selected amount of the system resources are available at the serving cell to effectuate the communication service with the mobile station; and a requestor operable responsive to determinations made by said determiner, said requestor for requesting allocation of the selected amount of system resources at only the serving cell if said determiner determines the selected amount of system resources to effectuate the communication service is available at the serving cell and for requesting allocation of system resources at the serving cell and at a selected additional cell of the at least one additional cell if said determiner determines the selected amount of system resources are unavailable at only the serving cell, the system resources at the serving cell and at the selected additional cell together forming the selected amount of system resources and the system resources at the serving cell and the selected additional cell together used to effectuate the communication service with the mobile station.

2. The apparatus of claim 1 wherein the base station defining the serving cell and each base station defining each of the at least one additional cells generates pilot signals and wherein said apparatus further comprises:

a set designator coupled to receive indications of signal strengths of the pilot signals generated by the base stations, said set designator for designating each base station defining each of the additional cells which generates a pilot signal, when received at the mobile station to be of a signal level at least as great as a first selected threshold, the base station, if any, associated therewith, forming members of a shared set.

3. The apparatus of claim 2 wherein the mobile station measures the signal strengths of the pilot signals generated by the base stations and wherein the indications of the signal strengths to which said set designator is coupled to receive are provided thereto by the mobile station.

4. The apparatus of claim 2 wherein the selected additional cell of which said requester requests allocation of the system resources is defined by a base station designated by said set designator to be a member of the shared set.

5. The apparatus of claim 2 wherein said determiner is further operable to determine whether a combination of the system resources available at the serving cell and at the selected additional cell provide the selected amount of system resources to effectuate the communication service.

6. The apparatus of claim 5 wherein, when said determiner determines the combination of the system resources available at the serving cell and at the selected additional cell is needed to effectuate the communication service, the request is made by said requester for the allocation of the selected amount of resources, and the allocation of the request is granted, a first portion of the communication service is provided by the base station defining the serving cell and a second portion of the communication service is provided by the base station defining the selected additional cell.

7. The apparatus of claim 6 wherein the mobile station includes a rake receiver having a first rake finger and at least a second rake finger, the first rake finger for operating upon signals generated by the base station defining the serving cell pursuant to providing the first portion of the communication service and the second rake finger for operating upon signals generated by the base station defining the selected additional cell pursuant to providing the second portion of the communication service.

8. The apparatus of claim 6 wherein the mobile station is selectably operable in a non-shared state and in a sharing state, wherein the mobile station includes a rake receiver having a first rake finger and the at least a second rake finger, and wherein, when the mobile station is operated in the non-shared state, signals generated by the base station defining the service cell and signals generated by the base station defining the selected additional cell are of common values.

9. The mobile station of claim 8 wherein the first rake finger is coupled to receive indications of the signals generated by the base station defining the serving cell, wherein the second rake finger is coupled to receive indications of the signals generated by the base station defining the selected additional cell and wherein the mobile station further comprises:

a combiner selectably coupled to said first rake finger and to said second rake finger, said combiner for combining indications of the signals received at said first rake finger and at said second rake finger, respectively, when the mobile station is operated in the soft-hand off state.

10. The apparatus of claim 1 wherein determinations made by said determiner and requests made by said requestor are made during communication service set-up.

11. The apparatus of claim 10 wherein the determinations made by said determiner and requests made by said requestor are further made during effectuation of the communication service.

12. The apparatus of claim 11 wherein said requestor requests reallocation of system resources during performance of the communication service responsive to a change in the determinations made by said determiner.

13. In a method for effectuating a communication service in a radio communication system having a serving cell and at least one additional cell, each of the serving cell and the at least one additional cell defined by a base station selectively capable of communicating with a mobile station pursuant to the communication service, the communication service requiring allocation of a selected amount of system resources to effectuate the communication service, an improvement of a method for allocating, if possible, the selected amount of system resources to effectuate the communication service with the mobile station, said method comprising:

determining, responsive to communication indicia of communications between the mobile station and the base station defining the serving cell and between the mobile station and a base station defining at least one of the at least one additional cell, whether the selected amount of the system resources are available at the serving cell to effectuate the communication service with the mobile station;

requesting allocation of the system resources at only the serving cell if determination is made during said operation of determining that the selected amount of the system resources to effectuate the communication service is available at the serving cell; and alternately requesting allocation of system resources at the serving cell and at a selected additional cell of the at least one additional cell if determination is made during said operation of determining that the selected amount of resources to effectuate the communication service requires system resources at both the serving cell and the selected additional cell, the system resources at the serving cell and the selected additional cell together used to effectuate the communication service with the mobile station.

14. The method of claim 13 comprising the additional operations of:

measuring signal strengths of pilot signals generated by the base stations;

designating selected ones of the base stations to be members of a shared set if signal strengths of the pilot signals generated thereat are at least as great as a selected threshold.

15. The method of claim 14 wherein the selected additional cell at which allocation of system resources is selected during the second operation of requesting is selected from members of the shared set designated during said operation of designating.

16. The method of claim 13 wherein said operation of determining and said operations of requesting are performed during communication set-up.

17. The method of claim 16 wherein determinations made during said operation of determining are further made during effectuation of the communication service.

18. In a communication system having a serving cell and at least one additional cell, each of the serving cell and the at least one additional cell defined by a base station selectively capable of communicating pursuant to a communication service, the communication service requiring allocation of a selected amount of system resources to effectuate the communication service, an improvement of apparatus for a mobile station operable alternately pursuant to a non-shared mode and pursuant to a shared mode, said apparatus comprising:

a first rake-receiver rake finger coupled to receive indication of signals generated by the base station defining the serving cell, the signals to which said first rake-receiver rake finger is coupled to receive providing a first portion of the communication service when the mobile station is operated pursuant to the shared mode and the signals to which said first rake-receiver rake finger is coupled to receive providing an entire portion of the communication service when the mobile station is operated pursuant to the non-shared mode; and a second rake-receiver rake finger coupled to receive indications of signals generated by the base station defining a selected additional cell, the signals to which said second rake-receiver rake finger is coupled to receive providing a second portion of the communication service when the mobile station is operated pursuant to the shared mode and the signals to which said second rake-receiver rake finger is coupled to receive also providing the entire portion of the communication service when the mobile station is operated pursuant to a soft-handover mode of the non-shared mode.

19. The apparatus of claim 18 further comprising a combiner selectably coupled to said first rake-receiver rake finger and to said second rake-receiver rake finger when the mobile station is operated in the non-shared mode, said combiner for combining together indications of the signals received at said first rake-receiver rake finger and at said second rake-receiver rake finger when the mobile station is operated in the non-shared mode.

20. The apparatus of claim 19 further comprising a selector operable responsive to the mode in which the mobile station is operated, said selector for selectably coupling said combiner with said first rake-receiver rake finger and with said second rake-receiver rake finger when the mobile station is operated in the non-shared mode.

21. In a radio communication system having a serving cell and at least one additional cell, each of the serving cell and the at least one additional cell defined by a base station selectively capable of communicating with a mobile station pursuant to a communication service, the communication service requiring allocation of a selected amount of system resources to effectuate the communication service, an improvement of apparatus for allocating, if possible, the selected amount of system resources to effectuate the communication service, said apparatus comprising:

a determiner coupled to receive communication indicia of communication between the mobile station and the base station defining the serving cell and between the mobile station and a base station defining at least one of the at least one addition cell, said determiner operable responsive to the communication indicia to determine whether the selected amount of the system resources are available at the serving cell to effectuate the communication service;

a requester operable responsive to determinations made by said determiner, said requestor for requesting allocation of the selected amount of system resources at only the serving cell if said determiner determines the selected amount of system resources to effectuate the communication service is available at the serving cell and for requesting allocation of system resources at the serving cell and at a selected additional cell of the at least one additional cell, the system resources at the serving cell and at the selected additional cell together forming the selected amount of system resources; and a set designator coupled to receive indications of signal strengths of the pilot signals generated by the base stations, said set designator for designating each base station defining each of the additional cells which generates a pilot signal, when received at the mobile station to be of a signal level at least as great as a first selected threshold, the base station, if any, associated therewith, forming members of a shared set, and the selected additional cell of which the allocation of the system resources is requested by said requestor defined by a base station designated by said set designator to be a member of the shared set.

22. In a radio communication system having a serving cell and at least one additional cell, each of the serving cell and the at least one additional cell defined by a base station selectively capable of communicating with a mobile station pursuant to a communication service, the communication service requiring allocation of a selected amount of system resources to effectuate the communication service, the mobile station including a rake receiver having a first rake finger and at least a second rake finger, an improvement of apparatus for allocating, if possible, the selected amount of system resources to effectuate the communication service, said apparatus comprising:

a determiner coupled to receive communication indicia of communication between the mobile station and the base station defining the serving cell and between the mobile station and a base station defining at least one of the at least one additional cell, said determiner operable responsive to the communication indicia to determine whether the selected amount of the system resources are available at the serving cell to effectuate the communication service and said determiner further for determining whether a combination of the system resources available at the serving cell and the selected additional cell provide the selected amount of system resources to effectuate the communication service;

a requestor operable responsive to determinations made by said determiner, said requestor for requesting allocation of the selected amount of system resources at only the serving cell if said determiner determines the selected amount of system resources to effectuate the communication service is available at the serving cell and for requesting allocation of system resources at the serving cell and at a selected additional cell of the at least one additional cell, the system resources at the serving cell and at the selected additional cell together forming the selected amount of system resources such that, when the allocation of the request is granted, a first portion of the communication service is provided by the base station defining the serving cell and a second portion of the communication service is provided by the base station defining the selected additional cell, and the first rake finger for operating upon signals generated by the base station defining the serving cell and the second rake finger for operating upon signals generated by the base station defining the selected additional cell; and a set designator coupled to receive indications of signal strengths of the pilot signals generated by the base stations, said set designator for designating each base station defining each of the additional cells which generates a pilot signal, when received at the mobile station to be of a signal level at least as great as a first selected threshold, the base station, if any, associated therewith, forming members of a shared set.

23. In a radio communication system having a serving cell and at least one additional cell, each of the serving cell and the at least one additional cell defined by a base station selectively capable of communicating with a mobile station pursuant to a communication service, the communication service requiring allocation of a selected amount of system resources to effectuate the communication service, the mobile station selectably operable in a non-shared state and in a sharing state and the mobile station including a rake receiver having a first rake finger and at least a second rake finger, an improvement of apparatus for allocating, if possible, the selected amount of system resources to effectuate the communication service, said apparatus comprising:

a determiner coupled to receive communication indicia of communication between the mobile station and the base station defining the serving cell and between the mobile station and a base station defining at least one of the at least one additional cell, said determiner operable responsive to the communication indicia to determine whether the selected amount of the system resources are available at the serving cell to effectuate the communication service and said determiner further for determining whether a combination of the system resources available at the serving cell and the selected additional cell provide the selected amount of system resources to effectuate the communication service; and a requestor operable responsive to determinations made by said determiner, said requester for requesting allocation of the selected amount of system resources at only the serving cell if said determiner determines the selected amount of system resources to effectuate the communication service is available at the serving cell and for requesting allocation of system resources at the serving cell and at a selected additional cell of the at least one additional cell, the system resources at the serving cell and at the selected additional cell together forming the selected amount of system resources such that, when the allocation of the request is granted, a first portion of the communication services provided by the base station defining the serving cell and a second portion of the communication service is provided by the base station defining the selected additional cell, and wherein, when the mobile station is operated in the non-shared state, signals generated by the base station defining the service cell and the signals generated by the base station defining the selected additional cell are of common values.

* * * * *